US009946941B2

(12) United States Patent
Suddamalla et al.

(10) Patent No.: US 9,946,941 B2
(45) Date of Patent: Apr. 17, 2018

(54) LANE DETECTION (71) Applicant: Tata Consultancy Services Limited, Mumbai (IN)

(72) Inventors: Upendra Suddamalla, Bangalore (IN); Apurba Das, Bangalore (IN); Saikat Kundu, Bangalore (IN); Sameer Narendra Farkade, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 21 days.

(21) Appl. No.: 15/041,994

(22) Filed: Feb. 11, 2016

(65) Prior Publication Data

US 2016/0350603 A1 Dec. 1, 2016

(30) Foreign Application Priority Data

May 28, 2015 (IN) .......................... 2079/MUM/2015

(51) Int. Cl.
*G06K 9/00* (2006.01)
*G06K 9/46* (2006.01)
(Continued)

(52) U.S. Cl.
CPC ....... *G06K 9/00798* (2013.01); *G06K 9/4604* (2013.01); *G06K 9/4661* (2013.01);
(Continued)

(58) Field of Classification Search
USPC ..... 382/103, 104, 199, 173, 202; 340/425.5, 340/435, 907; 348/119
See application file for complete search history.

(56) References Cited

U.S. PATENT DOCUMENTS 5,398,292 A 3/1995 Aoyama
6,212,287 B1 4/2001 Olivieri et al.
(Continued)

FOREIGN PATENT DOCUMENTS

CN 103639264 6/2014

OTHER PUBLICATIONS

Chen, S.Y. et al. "Edge-based Lane Change Detection and its Application to Suspicious Driving Behavior Analysis," *Third International Conference on Intelligent Information Hiding and Multimedia Signal Processing*, Nov. 26-28, 2007, Kaohsiung, Taiwan; pp. 415-418.
(Continued)

*Primary Examiner* — Anh H Do
(74) *Attorney, Agent, or Firm* — Finnegan, Henderson, Farabow, Garrett & Dunner LLP (57) ABSTRACT This disclosure relates generally to lane detection, and more particularly to method and systems for lane detection. In one embodiment, a method for lane detection is includes generating an edge image including inbound edges of lane-markings corresponding to a road image. Based on an adaptive thresholding of intensity of lane-markings from image strips selected from the image, a plurality of lane masks are extracted. A plurality of valid lane masks are selected from the plurality of lane masks based on a structure and intensity information of the plurality of valid lane masks in the image strips. An overlap between the inbound edges and the valid lane masks is determined to identify a plurality of edge segments of the pair of inbound edges belonging to the lane-markings. A set of valid edge segments of the pair of inbound edges are obtained based on the curvature information of the edge segments.

15 Claims, 5 Drawing Sheets (51) Int. Cl.
  *G06K 9/52* (2006.01)
  *G06T 7/60* (2017.01)
  *G06T 7/13* (2017.01)

(52) U.S. Cl.
  CPC ............ *G06K 9/52* (2013.01); *G06T 7/13* (2017.01); *G06T 7/60* (2013.01); *G06T 2207/30256* (2013.01)

(56) References Cited

U.S. PATENT DOCUMENTS

| | | |
|---|---|---|
| 6,546,118 B1 | 4/2003 | Iisaka et al. |
| 6,879,706 B2 | 4/2005 | Satoh et al. |
| 8,116,523 B2 * | 2/2012 | Amagasaki ........ G06K 9/00798 340/425.5 |
| 8,948,519 B2 * | 2/2015 | Sakurai ................ B60W 30/12 382/104 |
| 2002/0080019 A1 | 6/2002 | Satoh et al. |
| 2011/0164790 A1 | 7/2011 | Sakurai |

OTHER PUBLICATIONS

Tran, T-T. et al., (2010), "An Adaptive Method for Detecting Lane Boundary in Night Scene," *Advanced Intelligent Computing Theories and Applications. With Aspects of Artificial Intelligence*, No. 6216, pp. 301-308.

Chen, S-Y. et al. "Intelligent Information Hiding and Multimedia Signal Processing,"*Third International Conference on Intelligent Information Hiding and Multimedia Signal Processing*, Nov. 26-28, 2007, Kaohsiung City, Taiwan; 4 pages.

Tran, T-T. et al. (2010). "An Adaptive Method for Detecting Lane Boundary in Night Scene,"*Advanced Intelligent Computing Theories and Application. With Aspects of Artificial Intelligence*. Huang, D.S., Zhang, X., Reyes Garcia C.A., Zhang, L. eds., Lecture Notes in Computer Science, vol. 6216, Springer, Berlin, Heidelberg, pp. 301-308.

* cited by examiner

LANE DETECTION

PRIORITY CLAIM

This U.S. patent application claims priority under 35 U.S.C. § 119 to: India Provisional Patent Application No. 2079/MUM/2015, filed on May 28, 2015. The entire contents of the aforementioned application are incorporated herein by reference.

TECHNICAL FIELD

This disclosure relates generally to lane detection, and, more particularly, to lane detection under varying illumination and road conditions.

BACKGROUND

Detection of lane marking using visual information is a primary requirement for supporting driver assistance and safety features such as Lane Departure Warning (LDW), Lane Keep Assistance (LKA) and Forward Collision Alert (FCA). For detecting lane markings, cameras with clear sensors or color filtered sensors are used. For driver assistance applications, a vision sensor, i.e., camera is mounted in front of the vehicle to capture the road images. The camera is an assembly of a CMOS/CCD sensor of size VGA or HD used along with a lens of horizontal field of view (FOV) around 45 degree and vertical field of view of around 30 degree. The lane markings may vary in color (white and yellow for India, USA, Europe; Blue for South Korea), width and shape (solid and dashed).

Various conventional techniques to detect lanes include edge detection and line approximations to the edges and using global segmentation techniques. For example, in one technique the image region is the divided into sub regions and Hough lines are fitted to the edges in each sub regions to determine vanishing point. Another technique includes inverse perspective mapping of the image, detecting the lane marks by thresholding and then fitting Hough lines. Some techniques recommended using thresholding methods to extract the road lane markings.

The inventors here have recognized several technical problems with such conventional systems, as explained below. Although the aforementioned techniques perform well in the near view of the road and straight lane markings, however, to support the practical scenarios of lane detection, improved detection distance and detection of shapes like curvy and dashed lane markings should be addressed. Additionally, lane detection techniques can be improved from the accuracy and performance point of view for the embedded platforms used in vehicles.

SUMMARY

Embodiments of the present disclosure present technological improvements as solutions to one or more of the above-mentioned technical problems recognized by the inventors in conventional systems. For example, in one embodiment, a computer implemented method for lane detection is provided, where the method includes generating, via one or more hardware processors, an edge image corresponding to at least one image of a road having lane markings, where the edge image includes a pair of inbound edges corresponding to the lane markings. The method further includes extracting, via the one or more hardware processors, a plurality of lane masks from a plurality of horizontal image strips of the at least one image. A lane mask of the plurality of lane masks in a horizontal image strip is indicative of a subset of the lane markings in the horizontal image strip. The plurality of lane masks are extracted, via the one or more hardware processors, based on an adaptive thresholding of intensity of the subset of the lane markings in the plurality of horizontal image strips. Furthermore, the method includes selecting, via the one or more hardware processors, a plurality of valid lane masks from amongst the plurality of lane masks based at least on structure information and intensity information of the plurality of lane masks in the plurality of horizontal image strips. Moreover, the method includes determining, via the one or more hardware processors, an overlap between the pair of inbound edges and the plurality of valid lane masks to identify a plurality of edge segments of the pair of inbound edges corresponding to the lane markings. The plurality of edge segments of the pair of inbound edges includes a curvature information, where the curvature information of an edge segment being indicative of curvature of the edge segment with respect to the lane markings. A set of valid edge segments of the pair of inbound edges is obtained, via the one or more hardware processors, based on the curvature information. The set of valid edge segments facilitates in detecting the lane markings.

In another embodiment, a computer-implemented system for lane detection is provided. The system includes memory; and one or more hardware processor, the at least one memory coupled to the at least one processor and the at least one media sensor wherein the at least one processor is capable of executing programmed instructions stored in the at least one memory to: generate an edge image corresponding to at least one image of a road having lane markings where the edge image comprising a pair of inbound edges corresponding to the lane markings. The system is further caused to extract a plurality of lane masks from a plurality of horizontal image strips of the at least one image, where a lane mask of the plurality of lane masks in a horizontal image strip is indicative of a subset of the lane markings in the horizontal image strip. The plurality of lane masks are extracted based on an adaptive thresholding of intensity of the subset of the lane markings in the plurality of horizontal image strips. The system is further caused to select a plurality of valid lane masks from amongst the plurality of lane masks based at least on structure information and intensity information of the plurality of lane masks in the plurality of horizontal image strips. An overlap is determined between the pair of inbound edges and the plurality of valid lane masks to identify a plurality of edge segments of the pair of inbound edges corresponding to the lane markings. The plurality of edge segments of the pair of inbound edges includes a curvature information. The curvature information of an edge segment being indicative of curvature of the edge segment with respect to the lane markings. The system is further caused to obtain a set of valid edge segments of the pair of inbound edges based on the curvature information, where the set of valid edge segments facilitates in detecting the lane markings.

In yet another embodiment, a non-transitory computer-readable medium having embodied thereon a computer program for executing a method for lane detection is provided, where the method includes generating an edge image corresponding to at least one image of a road having lane markings, where the edge image includes a pair of inbound edges corresponding to the lane markings. The method further includes extracting a plurality of lane masks from a plurality of horizontal image strips of the at least one image.

A lane mask of the plurality of lane masks in a horizontal image strip is indicative of a subset of the lane markings in the horizontal image strip. The plurality of lane masks are extracted based on an adaptive thresholding of intensity of the subset of the lane markings in the plurality of horizontal image strips. Furthermore, the method includes selecting a plurality of valid lane masks from amongst the plurality of lane masks based at least on structure information and intensity information of the plurality of lane masks in the plurality of horizontal image strips. Moreover, the method includes determining an overlap between the pair of inbound edges and the plurality of valid lane masks to identify a plurality of edge segments of the pair of inbound edges corresponding to the lane markings. The plurality of edge segments of the pair of inbound edges includes a curvature information, where the curvature information of an edge segment being indicative of curvature of the edge segment with respect to the lane markings. A set of valid edge segments of the pair of inbound edges is obtained based on the curvature information. The set of valid edge segments facilitates in detecting the lane markings.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
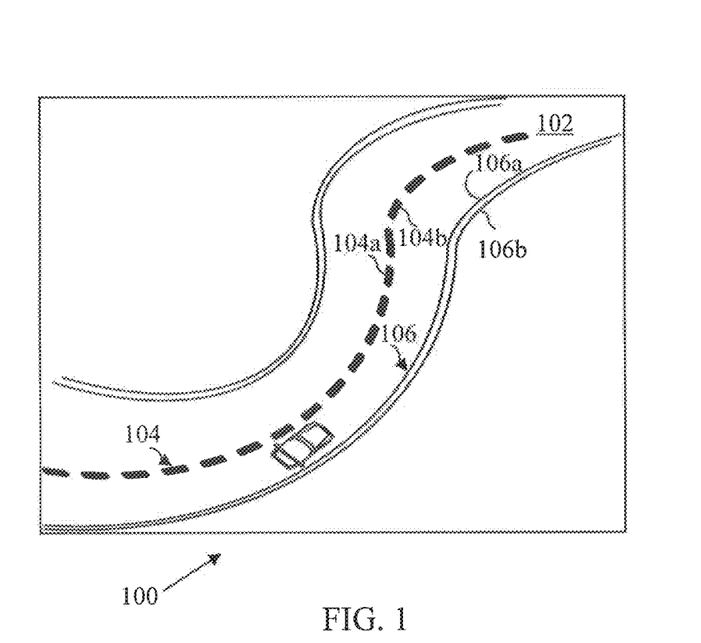
FIG. 1 illustrates an example environment for lane detection system according to some embodiments of the present disclosure.

FIG. 1 illustrates an example environment 100 for lane detection, in accordance with an example embodiment. Lane detection refers to detecting the margins or bounds of a road, for example a road 102 so as to define a safe zone for driving. Such margins are defined by forming lane markings, such as markings 104 and 106. Lane markings on the road indicate the road traffic rules for the vehicle drivers and pedestrians. The markings used are in white, yellow or blue (in some geographies) in color. As part of advanced driver assistance systems and autonomous vehicles, accurate lane detection is an important task for different safety functionalities such as lane departure warning, lane keeping assistance, forward collision warning, and so on.

Various embodiments disclose methods and systems for lane detection by using a lane intensity (brightness) information and a structure information of lane markings and edges to identify accurate lane bounds. In addition, said embodiments target to detect solid, dashed, straight and curvy lane markings up to long distances under medium to low level noisy scenarios. Moreover, said embodiments facilitates in handling noises in a scene for detection of lane markings. For example, proposed methods and system enables lane detection in noisy scenarios such as light shadows, other vehicles in the scene. The proposed embodiments use the structure and color information of the lane markings, so as to extracts accurate inbounds of the lane marks which improves the accuracy in further components such a lane departure warning.

In an embodiment, the methods and systems detect the lane markings at farther distances by detecting the curved, straight lanes which are solid or dashed, using the pixel intensity and edge information. Herein, an edge may be defined region associated with a sharp change in the intensity with respect to neighboring regions (or pixels). For instance, the edges of lane markings 104 are illustrated as 104$a$, 104$b$, and the edges of the lane markings 106 are illustrated as 106$a$, 106$b$. Typically, lane markings are brighter compared to the road, hence the edges of the lane marking may be associated with the sharp change in intensity. An example system implemented for lane detection is described further with reference to FIG. 2.

Figure 2:
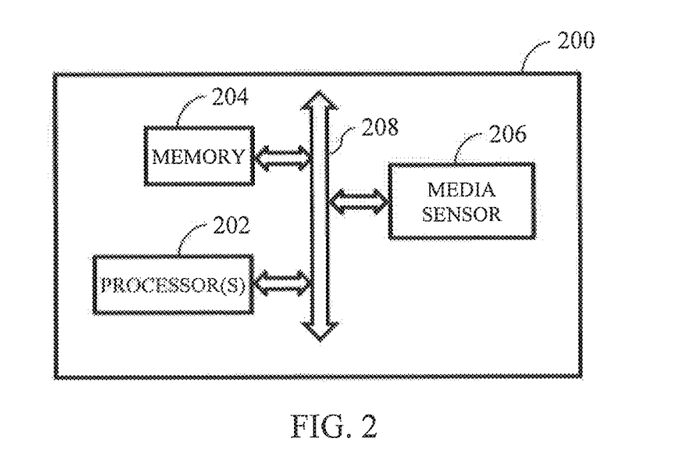
FIG. 2 is a block diagram of a system for lane detection according to some embodiments of the present disclosure.

FIG. 2 illustrates a block diagram of a system 200 for lane detection, in accordance with an embodiment of the present disclosure. In an embodiment, the system 200 facilitates in lane detection by detecting distance and detection of shapes like curvy and dashed lane markings on the road. For example, the system 200 is caused to detect the lane markings at farther distances by detecting the curved, straight lanes which are solid or dashed, using the pixel intensity and edge information of the edges of lane markings to identify the lane markings reliably. In order to achieve accurate inbounds of the lane, masks of the lane marking from spatial image strips and edges from the entire arbitrary frame are determined along with their mutual correspondence.

The system 200 includes or is otherwise in communication with one or more hardware processors such as a processor 202, at least one memory such as a memory 204, and at least one media sensor such as media sensor 206. In an embodiment, the processor 202, memory 204, and the memory 204, and the media sensor 206 may be coupled by a system bus such as a system bus 208 or a similar mechanism.

The processor 202 may include circuitry implementing, among others, audio and logic functions associated with the communication. For example, the processor 202 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 202 thus may also include the functionality to encode messages and/or data or information. The processor 202 may include, among other things, a clock, an arithmetic logic unit (ALU) and logic gates configured to support operation of the processor 202. Further, the processor 202 may include functionality to execute one or more software programs, which may be stored in the memory 204 or otherwise accessible to the processor 202.

The at least one memory such as a memory 204, may store any number of pieces of information, and data, used by the system to implement the functions of the system. The memory 204 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the system 200 to carry out various functions in accordance with various example embodiments. Additionally or alternatively, the memory 204 may be configured to store instructions which when executed by the processor 202 causes the system to behave in a manner as described in various embodiments.

In an embodiment, the media sensor 206 may include an image capturing module, such as a camera, video and/or audio module, in communication with the processor 202. The media sensor 206 may be any means for facilitating capturing images, video and/or audio for storage, display, or transmission. For example, in an exemplary embodiment in which the media sensor 206 may be embodied in a camera, such that the camera may be configured to form and save a digital image file from an image of the marker captured by the camera. The media sensor 206 may include hardware such as a CMOS/CCD (complementary metal-oxide semiconductor/charged coupled device) sensors configured for capturing images. In some embodiments, the media content such as images and/or videos of the road are captured and stored in a memory device, such as, memory 204. The media sensor 206 can include all hardware, such as circuitry, a lens or other optical component(s), and software for creating a digital image file from a captured image.

In some example embodiments, the media sensor may include only the hardware needed to view an image, while a memory device, such as the memory device of the system 200 stores instructions for execution by the processor 202 in the form of software to create a digital image file from a captured image. In an exemplary embodiment, the media sensor 206 may further include a processor or co-processor which assists the processor 202 in processing image data and an encoder and/or decoder for compressing and/or decompressing image data. The encoder and/or decoder may encode and/or decode according to, for example, a joint photographic experts group (JPEG) standard or other format.

In an example embodiment, the system 200 may be embodied in a vehicle. In an embodiment, the system 200 or at least the media sensors of the system 200 may be mounted on the vehicle, for example, behind the rear view mirror of vehicle, so that the system 200 may facilitate in capturing the images of the road in real-time. In an embodiment, the media sensors 206 may be embodied in a forward facing camera installed behind the rear view mirror. In an embodiment, the system 200 may facilitate in capturing images of the road when the vehicle is in motion or is stationary. The system 200 may utilize the captured images for estimating/detecting lane markings in real-time.

The system 200 is caused to detect lane markings on the road so as to determine a safe zone for driving. In an example embodiment, the processor 202 is configured to, with the content of the memory 204, and optionally with other components described herein, to cause the system 200 to detect lane markings on the road so as to determine a safe zone for driving. Herein, a width of the road lying within the pair of lane markings is determined to a safe zone for driving. As a lane is margined by lane markings on left and right and the lane markings on the road are of measurable thickness, the inbounds of the lane markings represent a safe region of the road. For this purpose, the system 200 is caused to identify the right edge of left lane marking and left edge of the right lane marking that may facilitate in determining the safe region.

In an embodiment, the system 200 is caused to convert the captured images into respective gray scale images, and perform further processing on the gray scale images for lane detection. In an example embodiment, the processor 202 is configured to, with the content of the memory 204, and optionally with other components described herein, to cause the system 200 to convert the captured images into respective gray scale images, and perform further processing on the gray scale images for lane detection. Hereinafter, the gray scale image may be referred to as an image. In an embodiment, the system 200 is caused to generate an edge image corresponding to one or more images (or gray scale images) of a road having lane markings captured by the camera/media sensor. The edge image distinctly illustrates pair of inbound edges corresponding to the lane markings. Herein, the edges of the lane markings represent the left edge and the right edge of each of the lane markings. An example of an image (gray scale image corresponding to a captured image) and a corresponding edge image are illustrated and explained further with reference to FIGS. 3A and 3B.

In an example embodiment, the system 200 is caused to identify the edges in the image by using an edge detection filter. An example of an edge detection filter may include a Canny edge detector. The detection of inbound edges corresponding to a single lane may include detecting rising and trailing edges of lane markings of said lane. Herein, the rising edge of the lane marking may correspond to the edge at which a transition from low pixel intensity to high pixel intensity is observed. Also, the trailing edge of the lane marking includes that edge of the lane marking at which a transition from high pixel intensity to low pixel intensity is observed. In an embodiment, the system 200 is caused to identify the rising and/or trailing edges of the lane markings based on the sign of the gradient along with the magnitude at each pixel. In an embodiment, the following pseudo code may be performed for extraction of edges from lane markings:

```
program ExtractEdges(In: InputImage,Output: EdgeDetails)
begin
DetectGradientImages( )
DetectTrailingEdges( )
DetectRisingEdges( )
CombineTrailingRisingEdges( )
end.
```

The system 200 is caused to select the pair of inbound edges of the lane markings upon selecting the rising and trailing edges from the edge image. In an example embodiment, the processor 202 is configured to, with the content of the memory 204, and optionally with other components described herein, to select the pair of inbound edges of the lane markings. For example, the system 200 may be caused to select the right edge of the left lane marking and the left edge of the right lane marking as the pair of inbound edges from the edge image. Herein, it will be noted that due to selection of only one edge from each of the lane markings, the number of edges to be considered for further processing are reduced, and hence the complexity in further processes to select the accurate inbounds of the lane markings is reduced.

In an embodiment, the system 200 is caused to extract a plurality of horizontal image strips from the image of the road. In an example embodiment, the processor 202 is configured to, with the content of the memory 204, and optionally with other components described herein, to extract the plurality of horizontal image strips from the image of the road Herein, the image strips from amongst the plurality of horizontal image strips includes a subset of the lane markings. An example of an image of a road and a corresponding image strip are illustrated and described further with reference to FIG. 4. In an example embodiment, the image strips are selected along the height of the image. It will be noted herein that the image is a gray scaled image of the image of the road that is captured by the camera/media sensor. In an example embodiment, selection of the strips along the height of the image facilitates in supporting dashed lane markings and curved lane markings (for instance, marking on a curved road as illustrated in FIG. 1). In an example embodiment, the selection of the strips and height of each strip are configured in such a way that lane marking at different distances ranging from nearer to farther distance from the camera/system 200 are covered. Also, such selection of the image strips facilitates in minimizing the larger variations in the views farther from the image (i.e. larger strips in nearer view and smaller strips in farther view). An example of variation in sizes of image strips along the height of the image is illustrated further with reference to FIG. 5, where the left lane marking is a solid line and right lane marking is a dashed line.

In an example embodiment, the plurality of image strips includes spatial subsets of the lane markings. In an example embodiment, the spatial subset of the lane marking may be present in most of the image strips and missing in few of the image strips. Herein, the spatial subset of the lane marking present in an image strip may be referred to as a 'lane mask'. In particular, a lane mask of the plurality of lane masks in a horizontal image strip is indicative of a subset of the lane markings in the horizontal image strip. In an embodiment, the system 200 is caused to extract the plurality of lane masks from the plurality of image strips. In an example embodiment, the processor 202 is configured to, with the content of the memory 204, and optionally with other components described herein, to extract the plurality of lane masks from the plurality of image strips. Herein, it will be noted that the images are captured by a forward facing camera mounted on a vehicle, and during the motion of the vehicle both the lane intensity profile and environmental illumination profile may be influenced. In addition, shadows of other objects such as vehicles, trees and so on influence the detection accuracy. Accordingly, the system 200 is caused to utilize adaptive thresholding of intensity of the subset of the lane markings in the plurality of horizontal image strips, to separate the lane masks from background in the plurality of horizontal image strips. Additionally, the system 200 is caused to validate the extracted lane masks based on a structure information of the extracted lane markings, as discussed below.

In an embodiment, applying the adaptive thresholding includes adaptive thresholding of intensity of lane markings in the at least one image. In an example embodiment, the processor 202 is configured to, with the content of the memory 204, and optionally with other components described herein, to apply the adaptive thresholding. Since the road intensities vary across the width and length of the road, considering small strips across the length of the road may facilitate in determining threshold values (of intensity) in each of the horizontal image strips to segregate the bright regions from the road background in said image strips. Said determination of the threshold value to segregate the bright regions from the road background may include adaptive binarization which may utilize an intensity profile or a histogram of the gray values in the horizontal image strips, and further determination of the best suitable threshold value to identify potential candidate image masks for lane marks with minimal noise. The highest peak in the histogram represents the intensity value of the lane region and the position of the peak varies according to the intensity variation of the road. The next highest peak of the histogram is observed to be around the intensity of the lane marking. In an embodiment, the system 200 is caused to eliminate the local peaks in the histogram that may occur due to image noises. In an example embodiment, the processor 202 is configured to, with the content of the memory 204, and optionally with other components described herein, to eliminate the local peaks in the histogram that may occur due to image noises. In an embodiment, the system 200 may be caused to eliminate the local peaks by performing the smoothing operation on the histogram to produce the low pass filtered envelop of the intensity profile. Further, a minima between the two maxima are determined from the smooth histogram. An example histogram of an image strip is further illustrated and described with reference to FIG. 6A, and a smoothed histogram is described with reference to FIG. 6B. The system 200 is caused to adaptively determine an intensity threshold to be taken for binarization looking for the lane-specific signature threshold by deriving minima between peak (first maxima) and following peak (second maxima) of the intensity profile from the intensity profile. Said adaptively determination of the intensity threshold is termed as Min Between Max Thresholding (MBMT). The method of MBMT for adaptively thresholding the intensity of lane markings in an image is further described in the Indian patent application number 1594/MUM/2015 titled "Method and System of Ground Truth Determination and Validation of Lane Detection Warning" and is incorporated herein by reference.

In an embodiment, the lane masks determined based on the adaptive thresholding of the plurality of image strips may include one or more non-lane marks also in addition to valid lane masks. Such non-lane masks may be caused due to shadows, local intensity variations of the road, vehicles in the scene, and other such factors. In an embodiment, the system 200 is caused to remove the non-lane masks from the potential lane masks (or the plurality of lane masks) based at least on the structure information and intensity information of lane masks in the respective horizontal image strips. In an example embodiment, the processor 202 is configured to, with the content of the memory 204, and optionally with other components described herein, to remove the non-lane masks from the potential lane masks (or the plurality of lane masks). The structure information of the lane masks may include shape and size of the lane masks in respective image strips. The lane markings in a smaller region or lane masks in an image strip may exhibit characteristics of a square or rectangle independent of curvy shape thereof in longer distance along the road. An example of a lane mask in an image strip is illustrated and described further with reference to FIG. 4. Also, the intensity information may include intensity values associated with the pixels of the lane markings.

In an embodiment, the system 200 is caused to select a plurality of valid lane masks from amongst the plurality of lane masks based at least on shape, size and intensity variation of the lane masks in the plurality of image strips. In an example embodiment, the processor 202 is configured to, with the content of the memory 204, and optionally with other components described herein, to select the plurality of valid lane masks from amongst the plurality of lane masks. For example, the system 200 may be caused to extract potential lane masks based on the intensity of the pixels associated with the lane masks, and further eliminate those masks from the potential lane masks that do not belong to lane markings. In an embodiment, the system 200 is caused to select a set of image strips having the valid lane masks therein. In an example embodiment, the processor 202 is configured to, with the content of the memory 204, and optionally with other components described herein, to select the set of image strips having the valid lane masks. The system 200 may further be caused to combine/join such image strips to reconstruct the image of the road having lane markings such that the reconstructed image includes the plurality valid lane masks. An example of a reconstructed image is described herein with reference to FIG. 4.

In an embodiment, the system 200 is caused to determine determining an overlap between the pair of inbound edges and the plurality of valid lane masks to identify a plurality of edge segments of the pair of inbound edges corresponding to the lane markings. In an example embodiment, the processor 202 is configured to, with the content of the memory 204, and optionally with other components described herein, to determine determining an overlap between the pair of inbound edges and the plurality of valid lane masks. In an embodiment, the overlap is determined by determining for each pixel associated with the pair of inbound edges, a presence of a corresponding pixel on one of the plurality of horizontal image strips. Herein, it will be noted that a plurality of portions or edge segments of the pair of inbound edges includes a curvature information. The curvature information of an edge segment of the pair of inbound edges at any point may include indicative of curvature of the edge segment with respect to the lane markings. In other words the edge information may include an angle by which said point or patch may deviate from being linear or in a straight line. Since, the lane markings exhibit spatial collinearity across different regions of the road, the system 200 may be caused to group selected lane edge portions/segments based on their collinearity/contiguity and a distance criteria. On the grouped edges, a smoothing is performed to minimize the local noises. The system 200 is further caused to compare each edge portion with other short listed edges to determine whether said edge portion belong to same lane marking (left lane marking or right lane marking). The system 200 is further caused to select or obtain a set of valid edge segments from amongst the pair of inbound edges (for example, the left lane marking and the right lane markings) that represents the LEFT and RIGHT lane marking based on location thereof in the image. In an example embodiment, the processor 202 is configured to, with the content of the memory 204, and optionally with other components described herein, to compare each edge portion with other short listed edges, and select or obtain a set of valid edge segments from amongst the pair of inbound edges. An example pseudo code for edge grouping for LEFT lane is shown below. Same steps can be followed for identifying edge group for RIGHT lane.

```
program GroupEdges(In: Shortlisted Edges, Output: LaneDetails)
begin
Create LEFT_Group
Add first LEFT Edge to the group
For each LEFT edge from the edge list
FitLine( )
FindContiguityWithGroup( )
FindDistanceWithGroup( )
If(Contiguity==TRUE &&
Distance<=DIST_THD)
MergeCurEdgeToGrp
end
end
Smooth LEFT_Group
end
```

In an embodiment, the edge segments that are determined to be overlapping with the lane masks are considered as lane bounds or valid edge segments. In an example embodiment, the system 200 is caused to accommodate the boundary cases where the mask is enlarged by performing the morphological dilation operation which enhances the boundaries of the mask. In an example embodiment, the processor 202 is configured to, with the content of the memory 204, and optionally with other components described herein, to perform the morphological dilation operation to enhances the boundaries of the mask. The morphological dilation operation may include expanding boundaries of the lane masks by a small amount (for example, one pixel on all sides) so as to accommodate the variations in rate of intensity changes at boundaries of lane mark and road under practical environmental conditions.

Figure 7A:
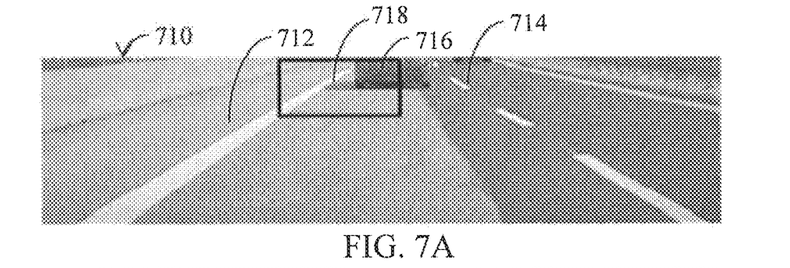
FIGS. 7A, 7B and 7C illustrates an example scenario for removing unintended edge portions from lane edges, in accordance with example embodiment of the present disclosure.
Figure 7B:
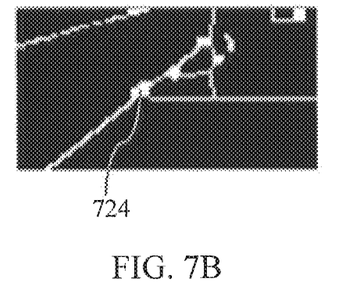
Figure 7C:
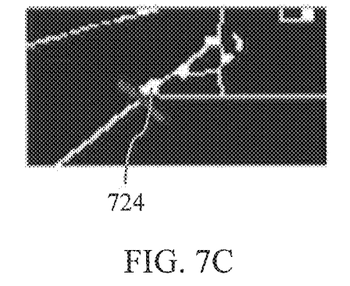

In certain scenarios, presence of vehicles and other objects in the scene may cause unintended edges that are connected to the edges of lane marking, thereby impacting the accuracy of the detection of the lane marking. The system 200 may be caused to separate the unintended edges from the lane edges so as to improve the quality of the edges passed for further processing. In an example embodiment, the processor 202 is configured to, with the content of the memory 204, and optionally with other components described herein, to separate the unintended edges from the lane edges. The unintended edges may connect with the lane edges by forming corners. A corner on the edge is the point which exhibits a high curvature. An example of such corners being formed due to unintended edge is illustrated and described further with reference to FIG. 7.

In an embodiment, the system 200 is caused to identify the unintended edges based on the curvature information so as to determine presence of corners. In an example embodiment, the processor 202 is configured to, with the content of the memory 204, and optionally with other components described herein, to identify the unintended edges based on the curvature information. The system 200 may further be caused to separate the unintended edges at the points where corner is detected, and obtain a set of valid edge segments from the pair of inbound edges. In an example embodiment, the processor 202 is configured to, with the content of the memory 204, and optionally with other components described herein, to separate the unintended edges at the points where corner is detected, and obtain a set of valid edge segments from the pair of inbound edges. Herein, the curvature information may include a geometrical angle between multiple points on the lane edge and the lane markings. In an embodiment, the system 200 is cased to determine whether a variation between the angles of curvature for the set of points located on each of the edge segment of the plurality of edge segments is greater than or equal to a threshold value of angle. This is done by considering three equally spaced points, for instance, $P_{i-n}(x_{i-n}, y_{i-n})$, $P_i(x_i, y_i)$, and $P_{i+n}(x_{i+i}, y_{i+1})$ on the contour of an edge. Assuming y-values are equally spaced, then $(x_{i-n}+x_{i-n}-2x_i)$ is computed for different set of three consecutive points on the contour of the lane edge. The system 200 may be caused to detect the set of points forming a potential corner by applying the condition as described below in equation (1)

$$CrnPtFlag = \begin{cases} 1 & \text{if } |x_{i-n} + x_{i+n} - 2x_i| > CThd \\ 0 & \text{otherwise} \end{cases} \quad (1)$$

Here, 'n' represents a distance between consecutive points i, and
CThd represents a threshold value of curvature.

In an embodiment, the values of 'n' and 'CThd' are optimally selected based on the image resolution and to avoid the local curvature variations due to image digitization. In an example embodiment, the value of 'CThd' may be selected in such a way that any curvature above 30 degree may be considered as corner point. In an embodiment, the local maxima is detected from the set of potential corner points to detect a corner point. An example pseudo code for detecting corner is as shown below:

```
program SeparateUnintendedEdges(In: Edge, Output: SeparatedEdges)
begin
ExtractContourOfTheEdge
At each point Pi(xi,yi)
FindAngleMeasureUsingThreePts( )
FindPotentialConrners( )
end
DetectTheLocalMaxima( )
SplitTheContourAtCornerPts
end
```

In an example embodiment, the system 200 is caused to mark one or more edge segments of the plurality of edge segments as a noisy edge segments on determination of said variation being greater than or equal to the threshold value of angle. The system 200 may further be caused to eliminate the noisy edge segments from the plurality of edge segments to obtain the set of valid edge segments. In an example embodiment, the processor 202 is configured to, with the content of the memory 204, and optionally with other components described herein, to mark the one or more edge segments, and eliminate the noisy edge segments from the plurality of edge segments to obtain the set of valid edge segments.

Figure 3A:
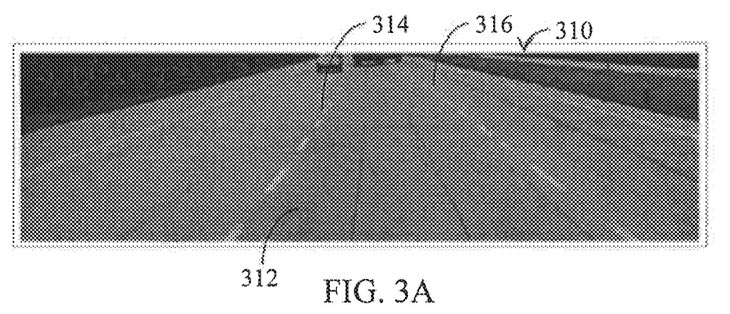
FIG. 3A illustrates an image of a road.
Figure 3B:
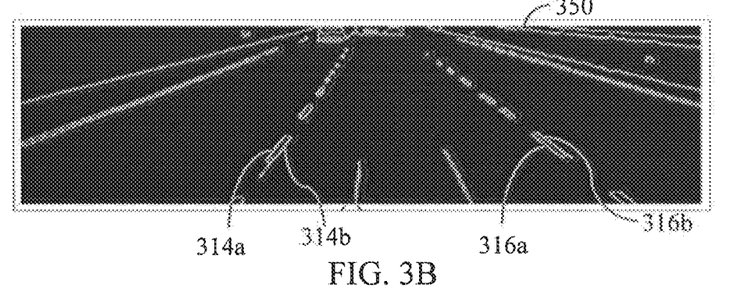
FIG. 3B illustrates an edge image corresponding to the image of FIG. 3A.
Figure 3C:
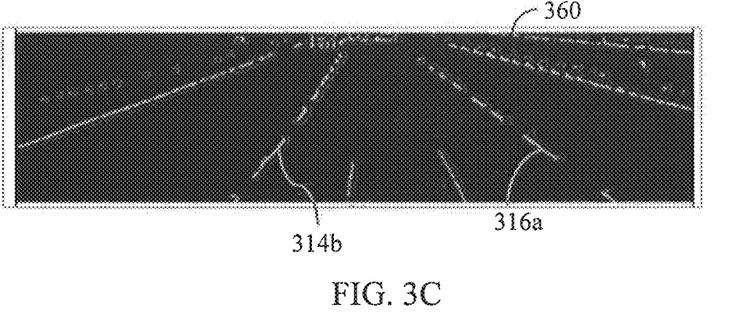
FIG. 3C illustrates image including inbound edges of lane markings of the edge image of FIG. 3B, in accordance with some embodiments of the present disclosure.

FIG. 3A illustrates an image 310 of a road, FIG. 3B illustrates an edge image 350 corresponding to the image 310 of FIG. 3A, and FIG. 3C illustrates image 360 including inbound edges of lane markings of the edge image 350 of FIG. 3B, in accordance with an example embodiment.

The visual representation of a road by means of the lane detection facilitates in performing various functions such as supporting driver assistance and safety features such as Lane Departure Warning (LDW), Lane Keep Assistance (LKA) and Forward Collision Alert (FCA). As discussed with reference to FIG. 2, an image of a road, for example a road 312 may be captured by a forward facing camera installed on or inside a vehicle. For instance, the camera may be installed behind the rear view mirror of the vehicle so as to enable the camera to capture image of the road. In an embodiment, such cameras may embody clear sensors or color filtered sensors. For Driver Assistance applications, a vision sensor, i.e., camera is mounted in front of the vehicle to capture the road images. The camera is an assembly of a CMOS/CCD sensor of size VGA or HD used along with a lens of horizontal field of view (FOV) around 45 degree and vertical field of view of around 30 degree. In an embodiment, the image captured by the camera may be a colored image, and may be converted to a gray scale image prior to performing further processing thereon for lane detection. For instance, the image 310 illustrated in FIG. 3A represents a gray scale image of the road 312.

As illustrated herein, the image 310 of the road 312 may include lane markings 314 and 316. The lane markings may vary in color for different countries. For example, the lane marking are in white and yellow color for India, USA, and Europe; and blue colored for South Korea. Moreover, the lane marking may be different width and shapes such as solid lane markings and dashed lane markings. In an embodiment, the disclosed system (for example, the system 200 of FIG. 2) is caused to detect the edges, and more specifically, the inbound edges of the lane markings in the image.

Herein the lane markings 314, 315 may be left and right side lane markings on the road. Herein, the term 'left' and 'right' may be used with reference to the vehicle, where the lane marking towards the left side of vehicle may be referred to as left lane marking, and the lane marking towards the right side of vehicle may be referred to as right lane marking. For the sake of clarity of description and distinguishing the pair of lane markings from each other, the pair of lane markings may be referred to as the first lane marking and a second lane marking.

Referring to FIG. 3B, the edge image 350 corresponding to the image 310 is illustrated herein. The edge image 350 may include the edges respectively of lane markings, for example the lane markings 314 and 316. For example, referring collectively to FIGS. 3B and 3C, the lane markings 314 include edges 314a and 314b, and the lane marking 316 includes edges 316a and 316b. As described with reference to FIG. 2, the system 200 is caused to detect the inbound edges of the lane markings for example, lane markings. The inbound edges refer to the edges of the lane markings that may define a safe zone for driving. Herein, the inbound edges are assumed to be left edge of the right lane marking and right edge of the left lane marking. For example, the inbound edges of the lane edges 314b and 316a may form the inbound edges of the lane markings 314 and 316. As is already described with reference to FIG. 2, the edges of lane markings may be identified by using edge detection filters.

Figure 4:
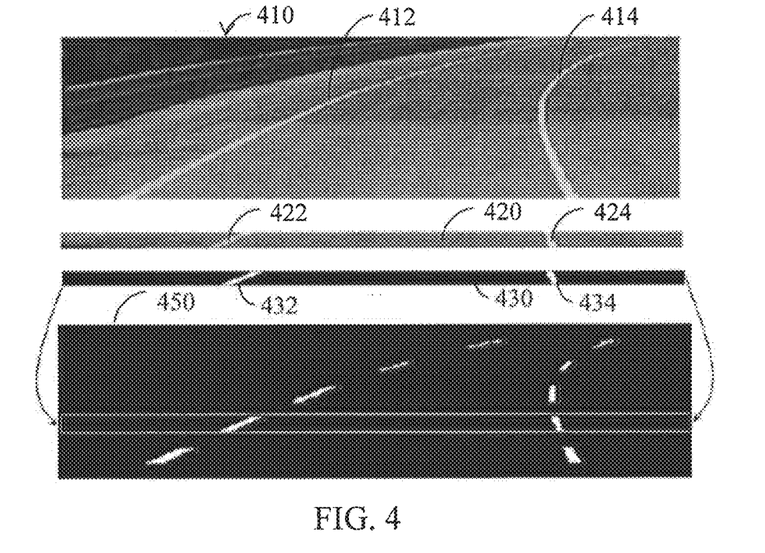
FIG. 4 illustrates an image of a road, an example horizontal image strip and a lane mask for the road, and a reconstructed image corresponding to the image, in accordance with some embodiments of the present disclosure.

FIG. 4 illustrates an image 410 of a road, an example horizontal image strip 420 and a lane mask 430 for the road, and a reconstructed image 450 corresponding to the image 410, in accordance with an example embodiment. The image 410 may be a gray scale image of the image captured by a camera. The image 410 of the road is shown to include a pair of lane markings, for example a lane marking 412 and 414. As described with reference to FIG. 2, the system 200 is caused to extract a plurality of horizontal image strips from the image, for example the image 410 of the road. An example horizontal image strip 420 is illustrated herein. An example of extracting horizontal image strips from the image is described further with reference to FIG. 5.

Herein, the horizontal image strip 420 includes a lane masks or spatial subset of the lane markings. For instance, the horizontal image strip 420 is shown to include lane masks 422, 424 of lane markings 412 and 414, respectively. Such spatial subsets 422, 424 of lane markings 412, 414, are referred to as lane masks. An example of lane masks corresponding to the lane marking portions of lane subsets 422, 424 is illustrated in image portion 430.

The image portion 430 is shown to include lane masks 432, 434 corresponding to the portion of lane markings 422, 424 in the horizontal image strip 420. In an embodiment, the lane masks may be detected or generated by applying adaptive thresholding on the image strip, for example the image strip 420. An example of applying adaptive thresholding is described with reference to FIGS. 6A and 6B.

In an embodiment, the lane masks generated by applying adaptive thresholding to the plurality of lane masks may be combined together to reconstruct an image, for instance, the image 450. In an example embodiment, the plurality of lane masks may be validated to obtain or select a plurality of valid lane masks from amongst the plurality of lane masks, and the plurality of valid lane masks may be utilized for reconstructing the image. As is understood, the reconstructed image 450 represents a region of interest (ROI) image with multiple thresholded strips, for instance the horizontal strip or image portion 430.

Figure 5:
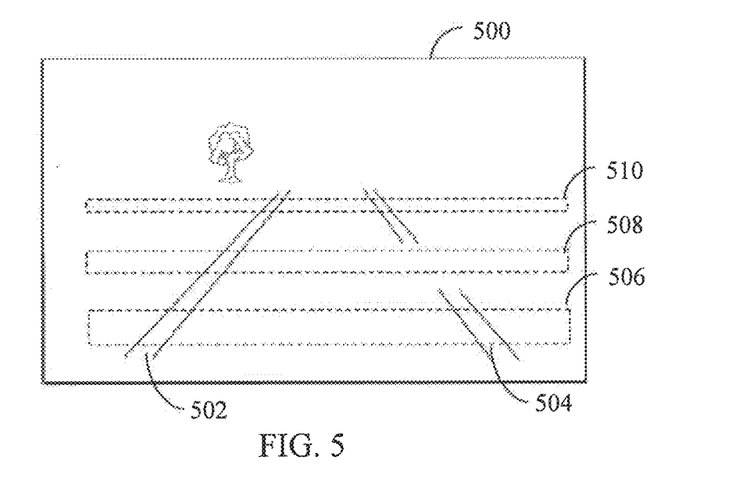
FIG. 5 illustrates an example representation for extracting a plurality of horizontal image strips corresponding to an image of a road, in accordance with an example embodiment of the present disclosure.

FIG. 5 illustrates an example representation 500 for extracting a plurality of horizontal image strips corresponding to an image of a road, in accordance with an example embodiment. As illustrated herein, the image represents a road region having lane markings 502, 504. The region of the road captured in an image is partitioned into a plurality of horizontal strips along the height of the image. For example, the image herein is partitioned by a plurality of horizontal strips such as strips 506, 508, and 510 along the height of the image. In an embodiment, the selection of the strips and the height of each strip are configured in such a way that lane marking at different distances ranging from nearer to farther distance from the camera are covered. In addition, such a configuration of the strips minimizes larger variations in the farther view, i.e. larger strips are configured in nearer views and smaller stripes in farther view. For example, the strip 506 which is closest to the camera is larger as compared to the strip 508 which is at a farther distance from the camera. In an embodiment, the described configuration facilitates in suitably capturing the strips from the image in which portions of the lane marking are dashed. As illustrated in FIG. 5, the lane marking 502 is a solid line and the lane marking 504 is a dashed line.

In an example embodiment, for each of the strips that are extracted from the image, potential candidates for lane masks may be extracted. In an embodiment, the potential candidates for lane masks can be extracted by applying adaptive thresholding to the plurality of horizontal image strips. As discussed with reference to FIG. 2, the system 200 implements adaptive binarization which uses histogram of the gray values in the horizontal image stripe and determines most suitable threshold value to identify potential candidate masks for lane marks with minimal noise. An example describing use of histogram (or an intensity profiles) of the horizontal image stripe is described further with reference to FIGS. 6A and 6B.

Figure 6A:
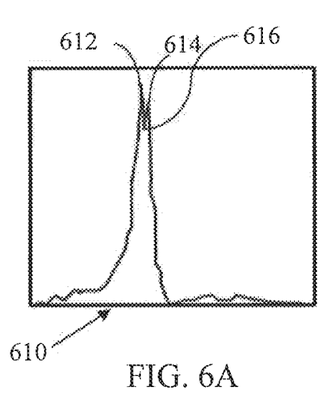
FIGS. 6A and 6B illustrate an example histogram for a horizontal image strip associated with an image, and a processed histogram corresponding to the horizontal image strip, in accordance with example embodiment of the present disclosure.
Figure 6B:
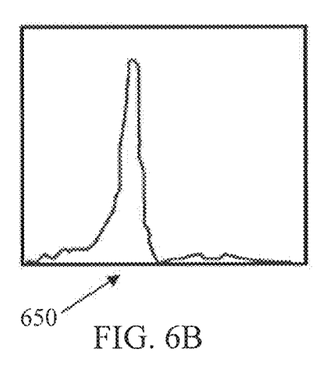

FIGS. 6A and 6B illustrate an example an intensity profiles or a histogram 610 for a horizontal image strip associated with an image, and a processed histogram 650 corresponding to the horizontal image strip, in accordance with an example embodiment. A histogram of an image is a graphical representation of distribution of pixel intensity across an image, for instance image of a road. In practice, the pixel intensities may vary across the width and length of the road. For example, the pixel intensity in the regions of lane markings may be higher that the pixel intensities in the other regions of the road. Thus, the histogram 610 corresponding to a horizontal image strip may indicate variation in pixel intensities of image pixels in the image strip. For example, the histogram 610 corresponding to an image strip, for instance, image strip 420 (FIG. 4) is shown to include a variation in the pixel intensities across the road. In an embodiment, the variation in the pixel intensities across the road in the histogram can facilitate in determining a threshold value to segregate the bright regions (indicating lane markings) from the road background.

The highest peak 612 (or maxima) in the histogram 610 represents an intensity value of the lane region and the position of the peak varies according to the intensity variation of the road. The next highest peak 614 (subsequent maxima) of the histogram 610 is observed to be around the intensity of the lane marking. The local peaks such in the histogram due to image noises are eliminated by performing the smoothing operation on the histogram 610 to produce the low pass filtered envelop of the intensity profile or a processed histogram 650, as illustrated in FIG. 6B. Further, minima 616, for example the minima 616 between the two maxima 612, 614 is determined from the smooth histogram 650. The minima 616 between the two maxima 612, 614 may be indicative of an intensity threshold for the respective horizontal image strip.

FIGS. 7A, 7B and 7C illustrates an example scenario for removing unintended edge portions from lane edges, in accordance with an example embodiment. For example, FIG. 7A illustrates an image 710 of a road having lanes such as lanes 712, 714. The image 710 may be a gray scale image. The image 710 also shows a vehicle 712 driving on the road such that shadow 714 of the vehicle 712 is overlapping with one of the lanes 712. Presence of unintended objects such as other vehicles, tress and so on in a scene where lane detection is to be performed can cause unintended edges that are connected to the edges of lane marking. For instance, presence of the vehicle 716 and shadow 718 of the vehicle 716 may cause unintended edges. Such unintended edges can connect with the lane edges by forming corners. An example corner being formed due to unintended edges is illustrated in FIG. 7B.

Referring to FIG. 7B, the corner being formed due to the unintended edge 722 formed by the vehicle shadow is marked as 724. In particular, edges of the car shadow are connected to the lane marking edges. In an embodiment, the system 200 (FIG. 2) is caused to identify and separate the edges at the points where such corner is detected. In an embodiment, the system 200 may utilize the curvature information or the angular spread at the edge to identify the corner. For example, the system may detect segmentation point in the edge based on the curvature information. In an embodiment, the system may consider those segment points as corner for which the curvature or angular spread is more than a threshold value of curvature, as described with reference to FIG. 2. For example, herein the curvature for point 724 on the edge is determined to be more than the threshold value of curvature.

Figure 8:
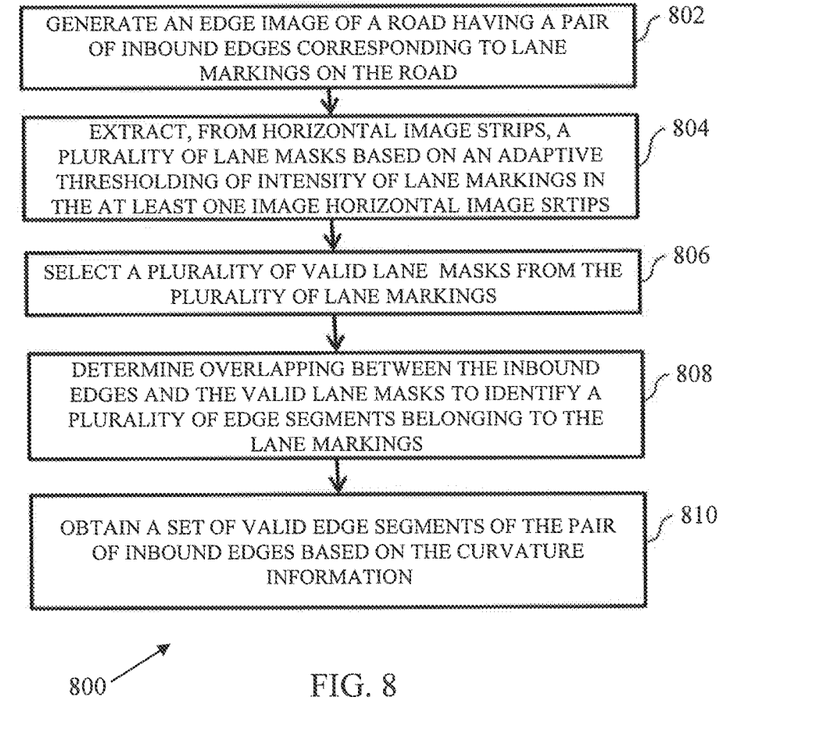
FIG. 8 illustrates a flow diagram illustrating a method for lane detection, in accordance with example embodiment of the present disclosure.

FIG. 8 illustrates a flow diagram of a method 800 for lane detection, in accordance with the present disclosure. In an embodiment, for lane detection a system (or a lane detection system) may be embodied in a vehicle. Example of such a system may include the system 200 (FIG. 2). In an embodiment, the system may include an media sensor (or a camera) for capturing the image of road on which vehicle may drive. Alternatively, the system 200 may be in communication with the camera for receiving input images from the camera, and process the input images so as to detect a safe zone within the lane markings for driving on the road. In an embodiment, the system may be caused to capture images of the road in real-time, and process the captured images. In an embodiment, prior to processing, the images may be preprocessed by for instance, converting the captured images into gray scale image.

At 802, an edge image corresponding to the image of the road is generated. The edge is representative of edges of lane markings on the road. In an embodiment, the edge image may include a pair of inbound edges corresponding to the lane markings. Examples of an edge image including the lane markings and inbound edges are illustrated with reference to FIG. 3B At 804, a plurality of horizontal image strips are extracted from the image such that the image strips include subset of the lane markings. An example of multiple image strips being extracted from the image is described and illustrated with reference to FIG. 4. In an embodiment, the a plurality of image strips may be selected from the image, and based on adaptive thresholding of intensity of lane markings in each of image strips, lane marking are extracted.

At 806, a plurality of valid lane markings are selected from amongst the plurality of potential lane markings. In an embodiment, the plurality of valid lane markings are selected based at least on shape, size and intensity variation of the subset of the lane markings in the respective image strips.

At 808, an overlapping between the inbound edges in the edge image and the subsets of the valid lane markings in the plurality of image strips is determined. Said overlapping facilitates in determining a plurality of portions of the pair of inbound edges belonging to the lane markings. In an embodiment, the plurality of portions of the pair of inbound edges are associated with a curvature information.

At 810, valid edge segments of the pair of inbound edges are obtained by excluding noise from the plurality of portions of the pair of inbound edges based on the curvature information. In an embodiment, the noise in the plurality of portions of the inbound edges unintended edge portions that may be formed due to shadows or other objects such as vehicles, trees, and so on.

Various embodiments of the disclosure provide method and system for lane detection in varied road conditions including unconstrained environment, curvature, shape, and noise deviation. The proposed method and system utilizes adaptive figure extraction, shape-based outlier rejection and empirical noise removal for performing lane detection.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for lane detection comprising, comprising:
generating, via one or more hardware processors, an edge image corresponding to at least one image of a road having lane markings, the edge image comprising a pair of inbound edges corresponding to the lane markings;
extracting, via the one or more hardware processors, a plurality of lane masks from a plurality of horizontal image strips of the at least one image, a lane mask of the plurality of lane masks in a horizontal image strip being indicative of a subset of the lane markings in the horizontal image strip, wherein the plurality of lane masks are extracted based on an adaptive thresholding of intensity of the subset of the lane markings in the plurality of horizontal image strips;

selecting, via the one or more hardware processors, a plurality of valid lane masks from amongst the plurality of lane masks based at least on structure information and intensity information of the plurality of lane masks in the plurality of horizontal image strips;

determining, via the one or more hardware processors, an overlap between the pair of inbound edges and the plurality of valid lane masks to identify a plurality of edge segments of the pair of inbound edges corresponding to the lane markings, wherein the plurality of edge segments of the pair of inbound edges comprises a curvature information, the curvature information of an edge segment being indicative of curvature of the edge segment with respect to the lane markings; and obtaining, via the one or more hardware processors, a set of valid edge segments of the pair of inbound edges based on the curvature information of the plurality of edge segments, wherein the set of valid edge segments facilitates in detecting the lane markings.

2. The method of claim 1, wherein the at least one image comprises a gray scale image of the road with the lane markings.

3. The method of claim 1, wherein the adaptive thresholding of the intensity of a subset of the lane markings in a horizontal image strip of the plurality of horizontal image strips comprises:

determining an intensity profile of the horizontal image;
deriving, from the intensity profile, a minima between a maxima and a subsequent maxima; and
adaptively determining an intensity threshold for the horizontal image strip based on the minima between the maxima and the subsequent maxima.

4. The method of claim 1, wherein determining the overlap between the pair of inbound edges and the plurality of valid lane masks comprises determining for each pixel associated with the pair of inbound edges, a presence of a corresponding pixel on one of the plurality of horizontal image strips.

5. The method of claim 1, wherein the curvature information of the edge segment comprises angles of curvature for a set of points located on the edge segment.

6. The method of claim 5, wherein obtaining the set of valid edge segments comprises:

determining whether a variation between the angles of curvature for the set of points located on each of the edge segment of the plurality of edge segments is greater than or equal to a threshold value of angle;
marking one or more edge segments of the plurality of edge segments as a noisy edge segments on determination of said variation being greater than or equal to the threshold value of angle; and
eliminating the noisy edge segments from the plurality of edge segments to obtain the set of valid edge segments.

7. The method of claim 1, wherein the plurality of horizontal image strips are of different heights.

8. A computer implemented system for lane detection, the system comprising:

a memory storing instructions; and
one or more hardware processors coupled to said memory, wherein said one or more hardware processors configured by said instructions to:

generate an edge image corresponding to at least one image of a road having lane markings, the edge image comprising a pair of inbound edges corresponding to the lane markings, extract a plurality of lane masks from a plurality of horizontal image strips of the at least one image, a lane mask of the plurality of lane masks in a horizontal image strip being indicative of a subset of the lane markings in the horizontal image strip, wherein the plurality of lane masks are extracted based on an adaptive thresholding of intensity of the subset of the lane markings in the plurality of horizontal image strips, select a plurality of valid lane masks from amongst the plurality of lane masks based at least on structure information and intensity information of the plurality of lane masks in the plurality of horizontal image strips, determine an overlap between the pair of inbound edges and the plurality of valid lane masks to identify a plurality of edge segments of the pair of inbound edges corresponding to the lane markings, wherein the plurality of edge segments of the pair of inbound edges comprises a curvature information, the curvature information of an edge segment being indicative of curvature of the edge segment with respect to the lane markings, and obtain a set of valid edge segments of the pair of inbound edges based on the curvature information of the plurality of edge segments, wherein the set of valid edge segments facilitates in detecting the lane markings.

9. The system of claim 8, wherein to perform the adaptive thresholding of the intensity of a subset of the lane markings in a horizontal image strip of the plurality of horizontal image strips, the one or more hardware processors are further configured by the instructions to:

determine an intensity profile of the horizontal image strip;
derive, from the intensity profile, a minima between a maxima and a subsequent maxima; and
adaptively determine an intensity threshold for the horizontal image strip based on the minima between the maxima and the subsequent maxima.

10. The system of claim 8, wherein to determine the overlap between the pair of inbound edges and the plurality of valid lane masks, the one or more hardware processors are further configured by the instructions to determine for each pixel associated with the pair of inbound edges, a presence of a corresponding pixel on one of the plurality of horizontal image strips.

11. The system of claim 8, wherein the curvature information of the edge segment comprises angles of curvature for a set of points located on the edge segment.

12. The system of claim 11, wherein to obtain the set of valid edge segments, the one or more hardware processors are further configured by the instructions to:

determine whether a variation between the angles of curvature for the set of points located on each of the edge segment of the plurality of edge segments is greater than or equal to a threshold value of angle;
mark one or more edge segments of the plurality of edge segments as a noisy edge segments on determination of said variation being greater than or equal to the threshold value of angle; and
eliminate the noisy edge segments from the plurality of edge segments to obtain the set of valid edge segments.

13. The system of claim 8, wherein the plurality of horizontal image strips are of different heights.

14. The system of claim 8, further comprising at least one media sensor coupled to the one or more hardware processors and the memory, wherein the at least one media sensor facilitates in capturing the at least one image.

15. A non-transitory computer-readable medium having embodied thereon a computer program for executing for lane detection comprising, comprising:

generating an edge image corresponding to at least one image of a road having lane markings, the edge image comprising a pair of inbound edges corresponding to the lane markings;

extracting a plurality of lane masks from a plurality of horizontal image strips of the at least one image, a lane mask of the plurality of lane masks in a horizontal image strip being indicative of a subset of the lane markings in the horizontal image strip, wherein the plurality of lane masks are extracted based on an adaptive thresholding of intensity of the subset of the lane markings in the plurality of horizontal image strips;

selecting a plurality of valid lane masks from amongst the plurality of lane masks based at least on structure information and intensity information of the plurality of lane masks in the plurality of horizontal image strips;

determining an overlap between the pair of inbound edges and the plurality of valid lane masks to identify a plurality of edge segments of the pair of inbound edges corresponding to the lane markings, wherein the plurality of edge segments of the pair of inbound edges comprises a curvature information, the curvature information of an edge segment being indicative of curvature of the edge segment with respect to the lane markings; and obtaining a set of valid edge segments of the pair of inbound edges based on the curvature information of the plurality of edge segments, wherein the set of valid edge segments facilitates in detecting the lane markings.

* * * * *